US010602844B2

(12) United States Patent
Elliston et al.

(10) Patent No.: US 10,602,844 B2
(45) Date of Patent: Mar. 31, 2020

(54) DOCUMENT HOLDER FOR DISPLAY MONITOR

(71) Applicants: Melanee Elliston, Draper, UT (US); Daniel Elliston, Draper, UT (US)

(72) Inventors: Melanee Elliston, Draper, UT (US); Daniel Elliston, Draper, UT (US)

(*) Notice: Subject to any disclaimer, the term of this patent is extended or adjusted under 35 U.S.C. 154(b) by 0 days.

(21) Appl. No.: 15/941,076

(22) Filed: Mar. 30, 2018

(65) Prior Publication Data

US 2018/0295995 A1 Oct. 18, 2018

Related U.S. Application Data

(60) Provisional application No. 62/486,515, filed on Apr. 18, 2017.

(51) Int. Cl.
*A47B 97/00* (2006.01)
*A47B 23/06* (2006.01)
*G06F 1/16* (2006.01)

(52) U.S. Cl.
CPC .............. *A47B 97/00* (2013.01); *A47B 23/06* (2013.01); *G06F 1/1611* (2013.01); *A47B 2097/005* (2013.01)

(58) Field of Classification Search
CPC ... G06F 1/1611; G06F 1/1686; A47B 21/045; A47B 2200/0094; A47B 23/044; A47B 97/00; A47B 23/06; A47B 2097/005; H04N 5/2251; G03B 11/041
USPC ................ 248/447, 442.2, 689, 441.1, 447.2
See application file for complete search history.

(56) References Cited

U.S. PATENT DOCUMENTS

| 649,293 | A | * | 5/1900 | French | A47B 23/043 248/456 |
| 2,505,814 | A | * | 5/1950 | Voorhorst | B41J 29/15 248/442.2 |
| 2,650,568 | A | * | 9/1953 | Voorhorst | B41J 29/15 248/442.2 |
| 3,021,637 | A | * | 2/1962 | Huffman | A47B 23/02 248/126 |
| 4,475,705 | A | * | 10/1984 | Henneberg | A47B 21/045 248/231.81 |
| D279,630 | S | * | 7/1985 | Bart | D19/91 |
| 4,588,074 | A | * | 5/1986 | Strong | B42F 7/14 206/45.2 |
| D327,501 | S | * | 6/1992 | Maloney | D19/86 |
| 5,301,915 | A | * | 4/1994 | Bahniuk | A47B 21/045 248/442.2 |

(Continued)

*Primary Examiner* — Ingrid M Weinhold
(74) *Attorney, Agent, or Firm* — Boudwin Intellectual Property

(57) ABSTRACT

A document holder for a display monitor is provided. The device includes a lower portion attached to an upper portion with a hinge, where the lower portion is, in turn affixable to an upper edge of a housing of a display monitor. The lower portion can be integral to the display monitor housing in one embodiment or can be removably secured thereto via a bracket in alternate embodiments. The lower portion further includes a pair of sidewalls and a front retaining wall defining a tray configured to support a document. The upper portion is rotatable between a deployed configuration and a stored configuration, such that the upper portion is positioned between the side retaining walls when the upper portion is in the stored configuration. In one use, documents are displayed above a display monitor within the document holder for enhanced visibility and accessibility.

11 Claims, 4 Drawing Sheets

(56) References Cited

U.S. PATENT DOCUMENTS

| | | | | |
|---|---|---|---|---|
| 5,692,719 A * | 12/1997 | Shepherd | A47B 19/002 | |
| | | | 248/188.7 | |
| 5,697,594 A * | 12/1997 | Adams | A47B 21/045 | |
| | | | 24/331 | |
| 5,769,374 A * | 6/1998 | Martin | G06F 1/1605 | |
| | | | 248/221.11 | |
| 5,979,856 A * | 11/1999 | Hsu | A47B 19/002 | |
| | | | 248/441.1 | |
| 6,499,713 B1 * | 12/2002 | Paoluccio | A47B 23/042 | |
| | | | 248/447.2 | |
| 7,028,966 B2 | 4/2006 | Bauman et al. | | |
| 7,611,117 B1 | 11/2009 | Lang | | |
| 7,817,411 B2 | 10/2010 | Lee et al. | | |
| D643,457 S * | 8/2011 | DeLong | 16/219 | |
| 8,056,878 B2 * | 11/2011 | Ramey, III | A47B 23/043 | |
| | | | 248/453 | |
| 8,672,285 B1 * | 3/2014 | Romero | A47B 21/045 | |
| | | | 248/442.2 | |
| D714,852 S * | 10/2014 | Levesque | D16/237 | |
| D718,803 S * | 12/2014 | Smith | D16/250 | |
| D726,807 S * | 4/2015 | DeMars | D14/448 | |
| 9,195,265 B1 | 11/2015 | Jackson | | |
| 9,197,850 B2 * | 11/2015 | Koberling | H04N 5/2251 | |
| 2009/0008349 A1 * | 1/2009 | Kim | G06F 1/1607 | |
| | | | 211/150 | |
| 2010/0044543 A1 * | 2/2010 | Ramey, III | A47B 21/045 | |
| | | | 248/449 | |
| 2011/0058255 A1 * | 3/2011 | Weiss | H04M 1/0264 | |
| | | | 359/511 | |
| 2013/0221180 A1 * | 8/2013 | Singh | G06F 1/1656 | |
| | | | 248/447.2 | |
| 2014/0220269 A1 * | 8/2014 | Ogufere Ogufere | B44C 5/005 | |
| | | | 428/34.1 | |
| 2018/0008044 A1 * | 1/2018 | Holt | G06F 1/1686 | |

\* cited by examiner

DOCUMENT HOLDER FOR DISPLAY MONITOR

CROSS REFERENCE TO RELATED APPLICATIONS

This application claims the benefit of U.S. Provisional Application No. 62/486,515 filed on Apr. 18, 2017. The above identified patent application is herein incorporated by reference in its entirety to provide continuity of disclosure.

BACKGROUND OF THE INVENTION

The present invention relates to document holders or trays. More specifically, the present invention provides a document holder than is configured to support documents or other objects above a display monitor for increased visibility and accessibility.

Many individuals perform work at a desk, table, or other surface that includes a display monitor connected to a computer or other electronic device. The display monitor and other objects on the desk can sometimes cause an inordinate amount of clutter, reducing available workspace. It can be difficult to find important physical documents that are scattered about a cluttered desk. Even if the physical documents are placed on the desk in an organized manner, it is difficult to observe both a display monitor and a physical document at the same time. Individuals may hold the document up next to the display monitor, which can be extremely tiring. The lack of organization and adequate document holders can lead to lost focus and lost productivity, among other negatives. In order to address these concerns, the present invention provides a document holder for a display monitor that is configured to support physical documents positioned above the display monitor, providing for enhanced accessibility and visibility.

Some document holder devices exist in the known art. However, these devices have several drawbacks. The devices in the known art typically only include small clips for holding single documents and do not have the ability to hold multiple documents in a position above a display monitor. These devices typically lack a support surface upon which the document can rest, meaning the document can easily become dislodged and wrinkled or otherwise damage. The devices in the known art also lack the ability to collapse or fold to a compact or stored position when not in use.

In light of the devices disclosed in the known art, it is submitted that the present invention substantially diverges in design elements from the known art and consequently it is clear that there is a need in the art for an improvement to existing document holder devices. In this regard the present invention substantially fulfills these needs.

SUMMARY OF THE INVENTION

In view of the foregoing disadvantages inherent in the known types of document holders now present in the prior art, the present invention provides a document holder for a display monitor wherein the same can be utilized for providing convenience for the user when supporting documents in a position above the display monitor. The present document holder includes a lower portion having an upper portion hingedly affixed thereto, wherein the lower portion is configured to affix to an upper edge of a housing of a display monitor. The lower portion includes a pair of sidewalls and a front retaining wall defining a tray configured to support a document therein. The upper portion is configured to rotate between a deployed configuration and a stored configuration, wherein the upper portion is positioned between the side retaining walls when the upper portion is in the stored configuration.

It is an object of the present invention to provide a document holder for a display monitor including a lower portion that is integral to the housing of a display monitor.

It is another object of the present invention to provide a document holder for a display monitor, wherein the lower portion is removably affixed to the housing of a display monitor housing via a bracket, the bracket comprising a front portion and rear portion defining a channel therebetween, wherein the channel is configured to receive the upper edge of the display housing in frictional engagement therewith.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
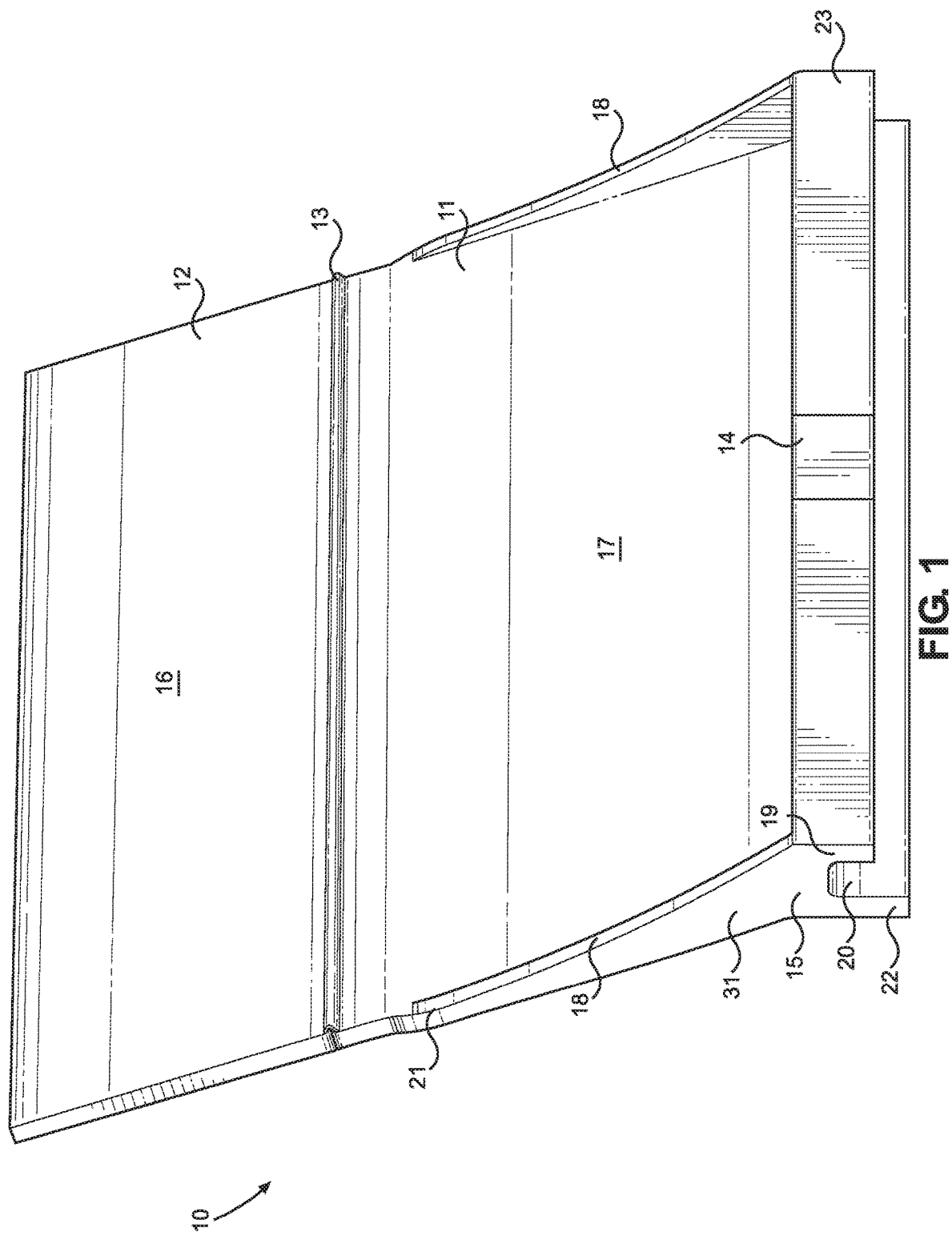
FIG. 1 shows a perspective view of a document holder according to the present invention.

Reference is made herein to the attached drawings. Like reference numerals are used throughout the drawings to depict like or similar elements of the document holder for a display monitor. For the purposes of presenting a brief and clear description of the present invention, the preferred embodiment will be discussed as used for providing a support surface for documents and other items that is either integral to or removably affixed to a display monitor. The figures are intended for representative purposes only and should not be considered to be limiting in any respect.

Referring now to FIG. 1, there is shown a perspective view of a document holder according to the present invention. The shown document holder 10 includes a lower portion 11 having an upper portion 12 affixed thereto via a hinge 13. In the shown embodiment, the hinge 13 extends across the width of the document holder 10 in order to provide a strong connection between the upper and lower portions 12, 11. However, in alternate embodiments, the hinge 13 can be smaller, may be an internal hinge, or may include multiple hinges. In yet another embodiment, the upper portion 12 can be integral to the lower portion 11 and have no hinge therebetween. As used herein, "affix" is intended to mean the upper portion 12 and lower portion 11 are connected in some way and covers embodiments wherein the upper portion 12 and lower portion 11 are hingedly connected, removably connected, integral or monolithic to one another, and the like. Similarly, the term "affix" when referring to the connection between the lower portion 11 and a display monitor housing is intended to cover both removable and integral connections therewith.

Figure 2:
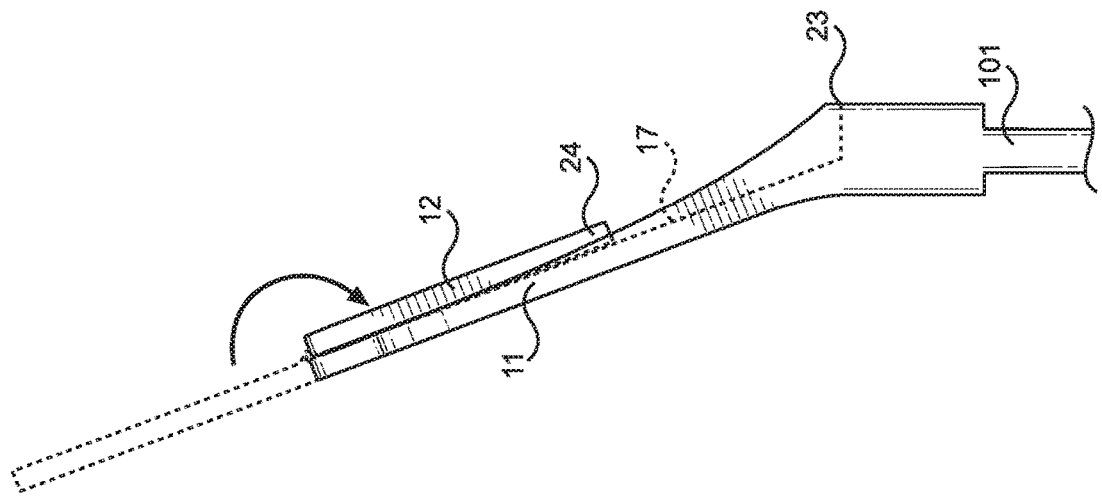
FIG. 2 shows a side view of a document holder according to the present invention with the upper portion in a deployed configuration.

The lower portion 11 comprises a pair of sidewalls 18. In the shown embodiment, each sidewall 18 includes an upper end 21 having a depth that is less than a depth of the lower end 31. The lower portion 11 further includes a front retaining wall 23, as shown in FIG. 2. The sidewalls 18 and front retaining wall 23 are configured to retain a document within the lower portion 11 of the document holder 10 along inner surface 17. In the shown embodiment, the front retaining wall 23 includes a removable webcam cover 14 configured to selectively obscure a webcam of the display monitor.

In the illustrated embodiment, a bracket 15 is disposed on the lower portion 11 which is configured to removably affix the document holder 10 to the upper edge of a display monitor housing. The bracket 15 comprises a front portion 19 and rear portion 22 defining a channel 20 therebetween, wherein the channel 20 is configured to receive the upper edge of the display housing in frictional engagement therewith. The front portion is formed by a lower portion of the front retaining wall 23. In alternate embodiments, the bracket 15 may include additional fasteners for further securing the document holder to the display monitor housing. In the shown embodiment, the rear portion 22 of the bracket includes a length greater than the front portion 19 of the bracket 15 for increased stability when securing the document holder.

Figure 3:
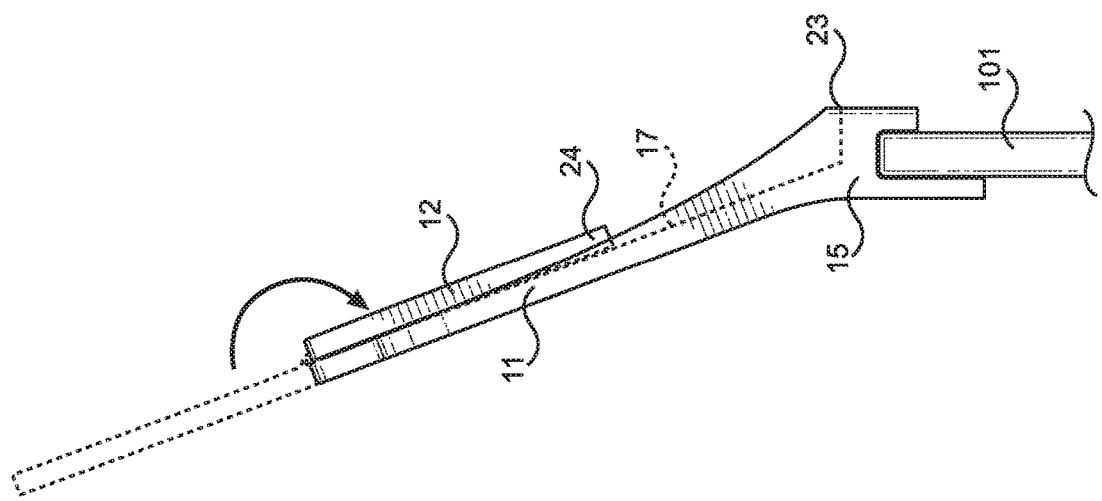
FIG. 3 shows a side view of a document holder according to the present invention with the upper portion in a stored configuration.

Referring now to FIGS. 2 and 3, there is shown a side view of a document holder according to the present invention with the upper portion in a deployed configuration and a side view of a document holder according to the present invention with the upper portion in a stored configuration, respectively. The upper portion 12 is configured to rotate about the hinge 13 between a deployed configuration and a stored configuration. When in the deployed configuration, an inner surface 16 of the upper portion 12 and an inner surface 17 of the lower portion 11 are disposed in a common plane, in order to provide a continuous support surface for a document.

Figure 4:
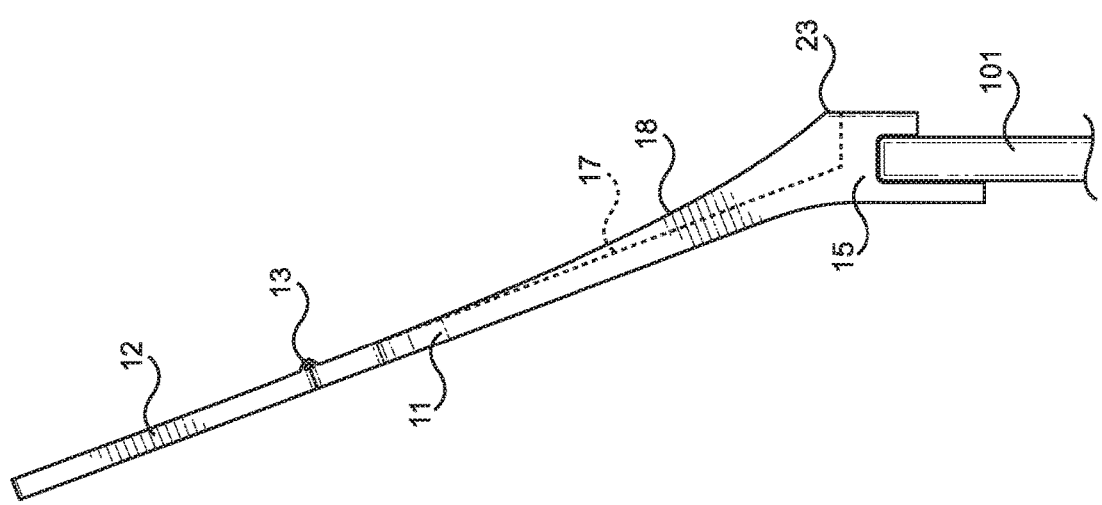
FIG. 4 shows a side view of an alternate embodiment of a document holder according to the present invention with the upper portion in a stored configuration.

When the upper portion 12 is rotated to the closed configuration, the document holder 10 maintains a smaller form factor while still retaining the ability to support documents if desired. The upper portion 12 includes a width that is less than a width of the lower portion 11, such that the outer edges 24 of the upper portion 12 are contained between the sidewalls 18 of the lower portion 11 when the upper portion 12 is rotated to the closed position, as shown in FIGS. 3 and 4. Further, the inner surface 16 of the upper portion 12 makes flush contact with the inner surface 17 of the lower portion 11 when in the stored configuration, further increasing the compactness of the document holder if desired.

Referring now to FIG. 4, there is shown a side view of an alternate embodiment of a document holder according to the present invention with the upper portion in a stored configuration. In the shown embodiment, the lower portion 11 of the document holder is integral to the display monitor 101. The integration of the document holder into the display monitor housing 101 provides increased stability. It is envisioned that display monitor housings can be produced that include an integral document holder according to the present invention, however both integral and non-integral embodiments of the document holder are intended to fall within the scope of the present invention.

Figure 5:
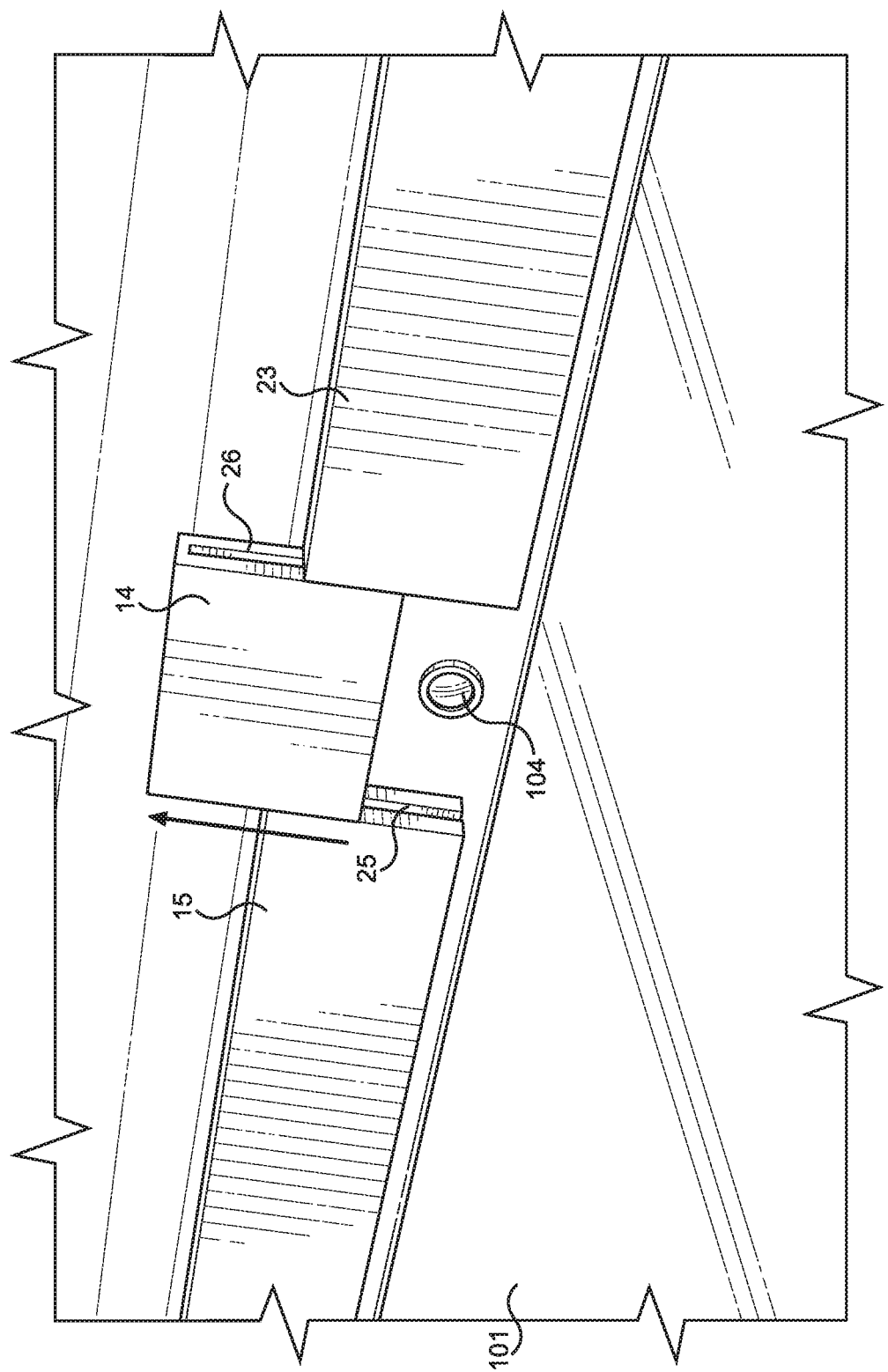
FIG. 5 shows a perspective view of the webcam cover of a document holder according to the present invention.

Referring now to FIG. 5, there is shown a perspective view of the webcam cover of a document holder according to the present invention. The webcam cover 14 is removably connected to the front retaining wall 23, which is coextensive with the bracket 15 in embodiments that include the bracket 15. When secured to the front retaining wall 23, the webcam cover 14 completely obscures a webcam 104 of the display monitor 101. Further, the webcam cover 14 is flush with the front retaining wall 23 when secured thereto, providing for a clean appearance when the webcam cover 14 is in place.

When the webcam cover 14 is removed from the front retaining wall 23, a gap is defined that allows the webcam 104 to be visible and utilized as desired. In the shown embodiment, the webcam 14 includes a tongue 26 disposed on opposing sides thereof, wherein each tongue 26 is configured to slidably engage a slot 25 disposed on the front retaining wall 23. In alternate embodiments, other forms of engagement or connection between the webcam cover 14 and the front retaining wall 23 may be utilized.

Figure 6:
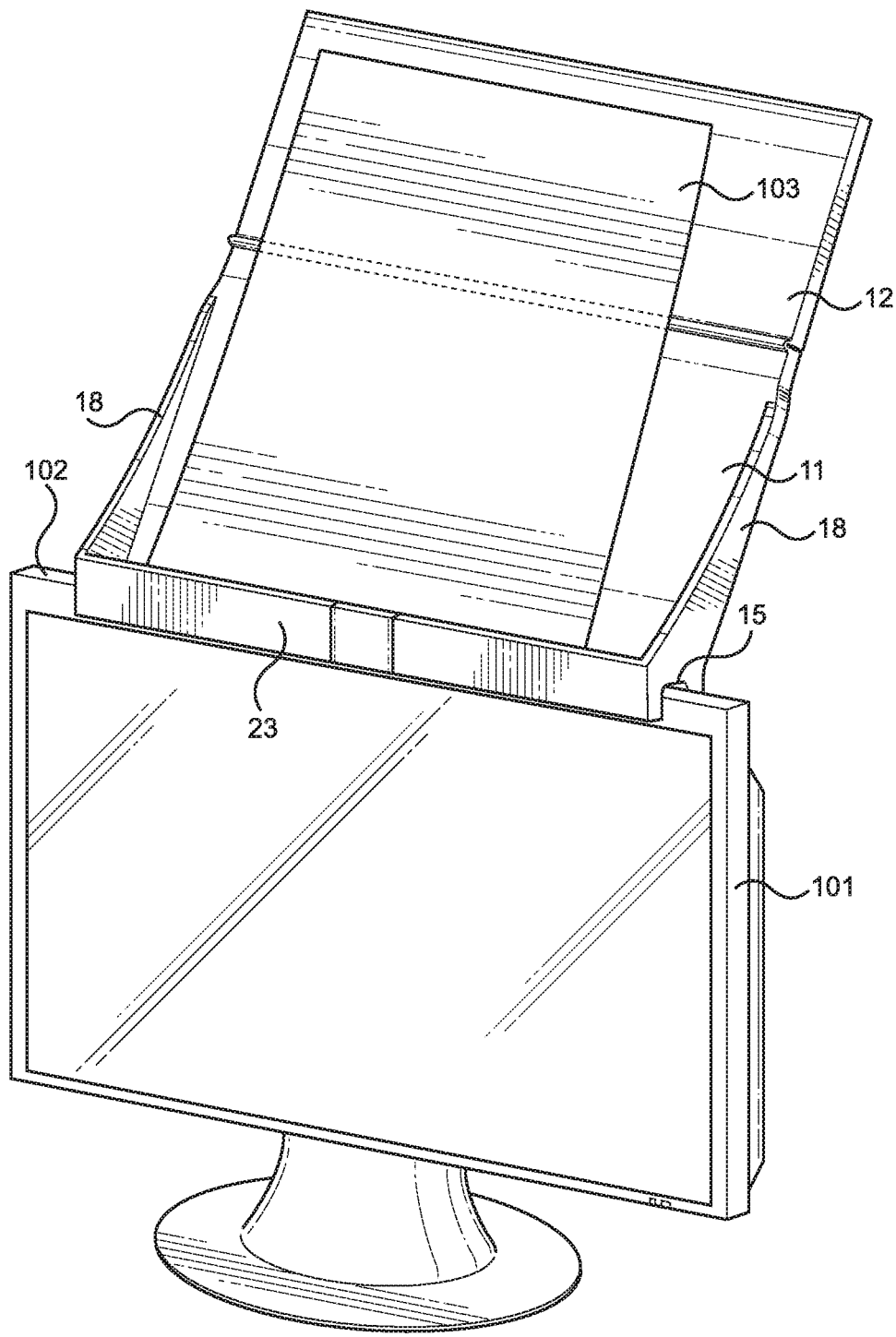
FIG. 6 shows a perspective view of a document holder according to the present invention affixed to a display monitor.

Referring now to FIG. 6, there is shown a perspective view of a document holder according to the present invention affixed to a display monitor. In the shown embodiment, the bracket 15 engages the upper edge 102 of the display monitor housing 101. A document 103 can be supported within the front retaining wall 23 and opposing sidewalls 18 of the lower portion 11, while the upper portion 12 supports the top part of the document 103. In this way, the document holder is configured to support documents 103 above the display manner 101 in a secure manner, so they may be easily visible and accessible as needed.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A document holder comprising:
   a lower portion having an upper portion affixed thereto, the lower portion being configured to affix to an upper edge of a housing of a display monitor;
   the lower portion comprising a pair of sidewalls and a front retaining wall defining a tray configured to support a document therein;

wherein the upper portion is configured to rotate between a deployed configuration and a stored configuration, wherein the upper portion is positioned between the pair of sidewalls when in the stored configuration; and a webcam cover removably connected to the front retaining wall, wherein the webcam cover is configured to obscure a webcam disposed on the housing of the display monitor when the document holder is affixed to the upper edge of the housing, and wherein a gap in the front retaining wall is formed when the webcam cover is removed for allowing the webcam to be utilized.

2. The document holder of claim 1, wherein the upper portion is hingedly affixed to the lower portion.

3. The document holder of claim 2, wherein an inner surface of the upper portion contacts an inner surface of the lower portion when the upper portion is in the stored configuration.

4. The document holder of claim 2, wherein an inner surface of the upper portion and an inner surface of the lower portion are disposed in a common plane when the upper portion is in the deployed configuration.

5. The document holder of claim 2, wherein the upper portion comprises a first width and the lower portion comprises a second width, wherein the first width is less than the second width.

6. The document holder of claim 1, wherein an upper end of each sidewall includes a depth that is less than a depth of a lower end of each sidewall.

7. The document holder of claim 1, wherein the lower portion comprises a bracket comprising a front portion and rear portion defining a channel therebetween, the front portion being formed by a lower portion of the front retaining wall, wherein the channel is configured to receive the upper edge of the display monitor housing in frictional engagement therewith.

8. The document holder of claim 7, wherein the rear portion of the bracket includes a length greater than the front portion of the bracket.

9. The document holder of claim 8, wherein the channel extends entirely across the lower portion of the document holder.

10. The document holder of claim 1, wherein the webcam cover includes a tongue thereon configured to slidably engage a slot disposed on the front retaining wall.

11. The document holder of claim 1, wherein an outer surface of the webcam cover is flush with an outer surface of the front retaining wall when the webcam cover is secured thereto.

* * * * *